(12) United States Patent
Morris et al.

(10) Patent No.: US 7,536,210 B1
(45) Date of Patent: May 19, 2009

(54) MODULAR HOUSING WITH HOUSING PLATES

(75) Inventors: Quintin Robert Morris, Port Jefferson, NY (US); Katrika Marie Woodcock, Simcoe (CA); Jorg Schlieffers, Streatley-on-Thames (GB); Christopher N. Crawford, Glen Cove, NY (US); Robert Kowalski, Commack, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 410 days.

(21) Appl. No.: 11/297,935

(22) Filed: Dec. 9, 2005

(51) Int. Cl.
  *H04M 1/00* (2006.01)
(52) U.S. Cl. ............... 455/575.1; 455/575.4; 455/575.6; 455/575.8
(58) Field of Classification Search ............... 455/575.1, 455/575.4, 575.6, 575.8
  See application file for complete search history.

(56) References Cited

U.S. PATENT DOCUMENTS

| | | | |
|---|---|---|---|
| 1,462,108 A * | 7/1923 | Holywell .................. 211/69.5 |
| 5,805,416 A * | 9/1998 | Friend et al. ................ 361/686 |
| 6,363,244 B1 * | 3/2002 | McGhee .................... 455/90.1 |
| 6,842,633 B1 | 1/2005 | Deo et al. |
| 6,944,015 B1 | 9/2005 | Jenkins et al. |
| 2005/0002520 A1 * | 1/2005 | Sun et al. .................... 379/447 |
| 2005/0174727 A1 * | 8/2005 | Thomas et al. ............. 361/681 |
| 2006/0166722 A1 * | 7/2006 | Gu .......................... 455/575.8 |
| 2007/0139873 A1 * | 6/2007 | Thomas et al. ............. 361/681 |

* cited by examiner

*Primary Examiner*—Nick Corsaro
*Assistant Examiner*—Vladimir Magloire

(57) ABSTRACT

Systems and methods that reduce a number of holes that penetrate into a housing of mobile computing device by employing a modular housing with a housing plate(s) attachable thereto. Such housing plates can form a segment of a stylus trough and also facilitate attachment of hand strap and socket cover arrangement to the housing of the mobile computing unit. By reducing number of openings into the housing, a risk of liquid or particulate contaminants entering into the device and degrading performance of the mobile computing unit can be reduced and reliability increased.

18 Claims, 11 Drawing Sheets

Section A-A

Section B-B

MODULAR HOUSING WITH HOUSING PLATES

BACKGROUND

With the recent increase in network computing applications, wireless information transfer, and internet applications, the number of applications for which data processing systems are employed has increased correspondingly. Mobile computing units such as personal digital assistants (PDA), notebook and laptop personal computers (PCs) have become increasingly popular due to their portability and increased functionality.

Commonly, such mobile computing units are handheld devices, or palm-size devices, which comfortably fit within, or can be carried by one hand. For example, one commercially available mobile device is sold under the trade name HandHeld PC (or H/PC). These units are generally assembled by enclosing internal electrical components, such as a central processing unit (CPU) board, display, keyboard, and internal wiring, within a housing made of plastic or another structural material. A communication interface is also provided and is commonly used to communicate with an associated network. The enclosure is usually formed in two parts having an upper housing and a lower housing. The electronic components are mounted to one or both sides of the housing with or without a subframe. A subframe can be employed to provide torsional rigidity to the structure. The display and sometimes the battery are also located within the enclosure.

Moreover, mobile hand held units can also employ accessories/attachments, which can require openings into the body of the housing. For example, a stylus/pen associated with the mobile computing unit is typically placed in a trough that penetrates into the body of the housing. Likewise, an attachment arrangement for a hand strap can require piercing holes in the body of the housing enclosure. Openings that are associated with such components and/or other troughs in the housing, invariably allow a contamination of the electronic unit. For example, liquid or particulate contaminants can find their way through openings in the housing, wherein moisture and other fine particles enter the unit and affect its performance during lifetime of the unit.

Additionally, many such electronic units employ various interface components including; switches, plugs, socket arrangements and communication ports, which are subsequently employed for any suitable communication interface of communication standards and/or protocols, e.g. parallel, SCSI, Firewire (IEEE 1934), Ethernet and the like. Openings that are associated with such interface components can also allow a contamination of the electronic unit. For example, liquid or particulate contaminants find their way through openings in the housing, wherein moisture and other fine particles enter the unit and affect its performance during lifetime of the unit. The reliability of the dedicated communication ports can also be affected over time. Some designers have resorted to various gasket arrangements attachable directly to the housing for mitigating such contamination. Nonetheless, such gasket arrangements require regular inspection and maintenance to assure proper functionality in harsh environments, e.g. high humidity and temperature, presence of corrosive agents and the like. Moreover, such gaskets are subject to wear and tear during a lifetime of the electronic unit, and a replacement thereof often necessitates disassembly of the unit.

At the same time, it is desired that housings for mobile computing unit be readily repairable with respect to its various accessories and/or components. Nonetheless, often damage to a stylus compartment for hand held typically requires a disassembly of the unit and replacing part of the housing. Likewise, if a hand strap attachment to the housing is to be repaired, there typically exists a requirement to take the housing apart as a whole, to perform such repairs, for example.

Therefore, there is a need to overcome the aforementioned exemplary deficiencies associated with conventional devices.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

The subject innovation provides for systems and methods of reducing number of openings that penetrate into a housing of mobile computing device by employing a modular housing with a housing plate(s) attachable thereto. Such housing plates can form a segment of a stylus compartment, and also facilitate attachment of hand strap and socket cover arrangement to the housing of the mobile computing unit, typically without requiring using an opening that penetrates into the housing of the mobile computing unit. By reducing number of openings into the housing, a risk of liquid or particulate contaminants entering into the device and degrading performance of the mobile computing unit can be reduced and reliability increased.

According to an aspect of the subject innovation, a stylus of the mobile computing unit can be housed in a compartment with sides that are formed by a segment of the back housing and an extension of the housing plate(s). For example, a compartment for a stylus can be created that does not penetrate in to the housing itself, and instead is formed adjacent/ as part of exterior for the housing of the mobile computing unit. Such compartment can have a cylindrical shape with a cross section formed from two semi-circular surface areas, wherein one semi circular surface area is a segment of the housing (e.g., back housing) and the other semi circular surface area is an extension/part of the housing plate, which is attachable to the back/front housing, for example. As such, if a portion of the compartment that is part of the housing plate is damaged, the housing plate can be readily replaced without typically a need for disassembling the mobile computing unit and/or the housing.

In a relate aspect, part of the housing plate(s) can extend over a recess in the back housing to form a bridge shaped element, which functions as an anchor to hold a hand strap. Such hand strap enters the recess from one side of the bridge shaped element and exits the recess from an opposing side of the bridge shaped element. As such, a replacement of the hand strap attachment can be readily performed by replacing the housing plate. Moreover, the requirement for having an opening that penetrates into the housing, as part of a hand strap attachment of the mobile computing unit, can be mitigated.

In accordance with a further aspect of the subject innovation, a cover (e.g., a rubber flap) that conceals a socket associated with the mobile computing unit can be sandwiched between the housing plate and the housing (e.g., back housing) of the mobile computing unit. Such cover can include a grip feature on one side and a hinge on another, wherein a user can expose the socket by holding the grip and rotating it around the hinge, to expose the socket.

In a related methodology, the cover can be readily replaced by removing the housing plate from the housing, without a requirement to disassemble the mobile computing unit and/or associated housing. As such and to replace a damaged socket cover associated with the housing of the subject innovation, the housing plate can be initially detached from the housing (e.g., by removing associated screws). Subsequently, the damaged socket cover can then be replaced with another socket cover. Such socket cover is placed between the mobile housing and the housing plate, and held in position via the force pushing the housing plate to the housing (e.g., compression/tension of screws that attach the housing plate to the housing).

Moreover, additional housing plates can be provided as part of the modular housing, to enable a slide of a handle associated with the mobile computing unit, and attachment thereto. As such a housing plate which can be positioned at a back side of the housing can include latches that are insertable into the latch receiving apertures in a handle. The handle can then slide and be inserted (e.g., on a rail system) such that its latches are securely engaged with the latch receiving notches and/or apertures of the housing plate. Accordingly, the handle can be removably connected to the mobile computing unit.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
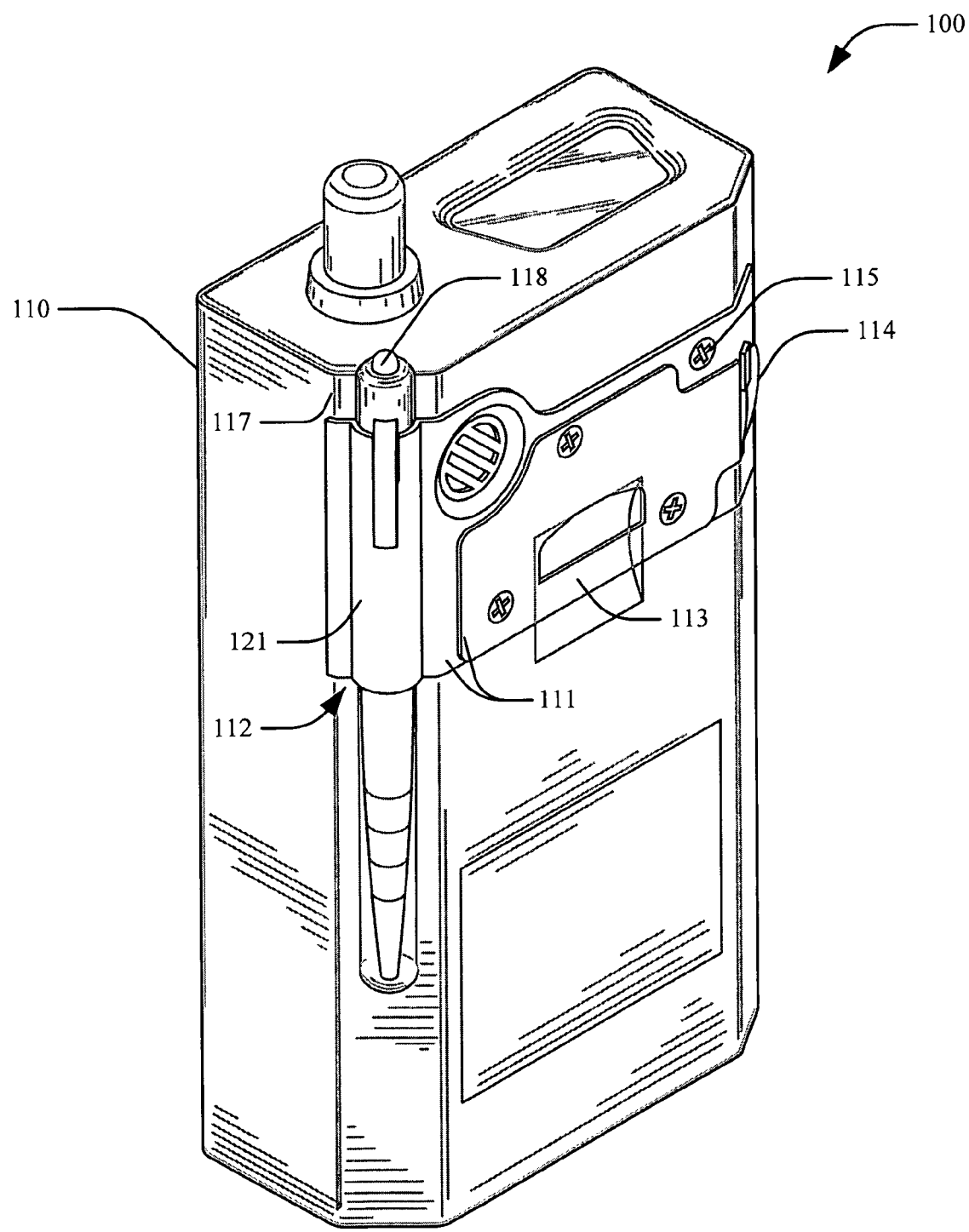
FIG. 1 illustrates a perspective view of a mobile computing unit with a modular housing that employs housing plates in accordance with an aspect of the subject innovation.

The subject innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the subject innovation can be practiced without these specific details. In other instances, well-known structures and devices are shown in block diagram form in order to facilitate describing the subject innovation.

Referring initially to FIG. 1, there is illustrated a perspective view of a mobile computing unit 100 with a modular housing that employs housing plates in accordance with an aspect of the subject innovation. The mobile computing unit 100 can be a palm top ("palm-sized") portable computer system, a cellular telephone, global positioning system (GPS), bar code scanner, hand held mobile terminal employed in a wireless communication network for tracking inventory, storing data, and the like.

The mobile computing unit 100 includes a housing 110 (e.g., enclosure) that can be a substantially one-piece casing employed to house electronic components or alternatively can be fabricated from attachment of a top housing and a bottom housing. To protect the mobile computing unit 100 and the associated electronic components—(e.g., a PC board containing electronics and logic memory, communication bus, processors and other components for implementing computer system functionality)—from outside contaminants, a number of holes that penetrate into such housing 110 of mobile computing unit can be reduced by employing a modular housing with a housing plate(s) 111 attachable thereto. Such housing plates 111 can form a portion of a stylus compartment/trough 112, and also supply a hand strap attachment 113 and socket cover arrangement 114 to the housing 110 of the mobile computing unit 100. By reducing number of openings into the housing 110, a risk of liquid or particulate contaminants entering into the device and degrading performance of the mobile computing unit 100 can be reduced and reliability increased.

The housing plates 111 can be fabricated from metal, plastic, or any other suitable structural material. Bosses and/or fastening hardware (e.g., screws) can be employed to secure the housing plate(s) 111 to the housing 110. Accordingly, the housing plate(s) 111 can be pressed upon the housing 110 via forces generated by the fastening component 115. The housing plate(s) 111 can also be secured to the housing 110 in place via the engagement between the latch(es) and the notch (es) and/or aperture(s), wherein a compression force is exerted on the housing plate(s) 111 to secure it to the housing 110.

The housing plate(s) 111 can include an extension 121 to form part of a compartment 112 employed for hosting a stylus 118. For example, the housing plate can a have semi-circular end portion 121 that mates with a corresponding semis-circular surface area as part of a back portion 117 of the housing 110. As such, a stylus 118 of the mobile computing unit 100 can be housed in a compartment 112 with sides that are formed by a segment of the back portion 117 of the housing 110 and an extension 121 of the housing plate(s). Thus, a compartment 112 for hosting the stylus 118 is created that does not penetrate in to the housing 110 itself, and instead is formed adjacent/as part of exterior for the housing 110 of the mobile computing unit 100.

The stylus 118 can be employed to activate a touch screen (not shown). The stylus compartment 112 is designed so that a user is able to push the stylus 118 out of the compartment 112 or alternatively pull the stylus 118 out by the clip end. The compartment 112 is located at a left side of the mobile computing unit 100, however it is to be appreciated that the compartment can be located on any side on the mobile computing unit 100. Openings are provided at the top and bottom of the stylus compartment 112, in which the top and bottom portions of the stylus 118 are accessible. Thus, the user can insert the stylus into the top opening of the stylus compartment 112 until the stylus 118 is fitted securely within such compartment 112. The stylus 118 can be wider at one end, for example, due to a clip (not shown) located at the end, so as to mitigate the stylus from sliding completely through the compartment 112. The opposite end of the pen is visible through the bottom opening of the compartment when the stylus 118 is fully secured within the compartment 112. With such configuration, the stylus 118 can be removed from the compartment by a pushing action applied to the bottom portion of the stylus 118, thus, pushing the stylus 118 upward and out of the compartment 112. Alternatively, the removal of the stylus 118 from the compartment 112 can occur by pulling it out of the compartment 112.

Figures 2A, 2B:
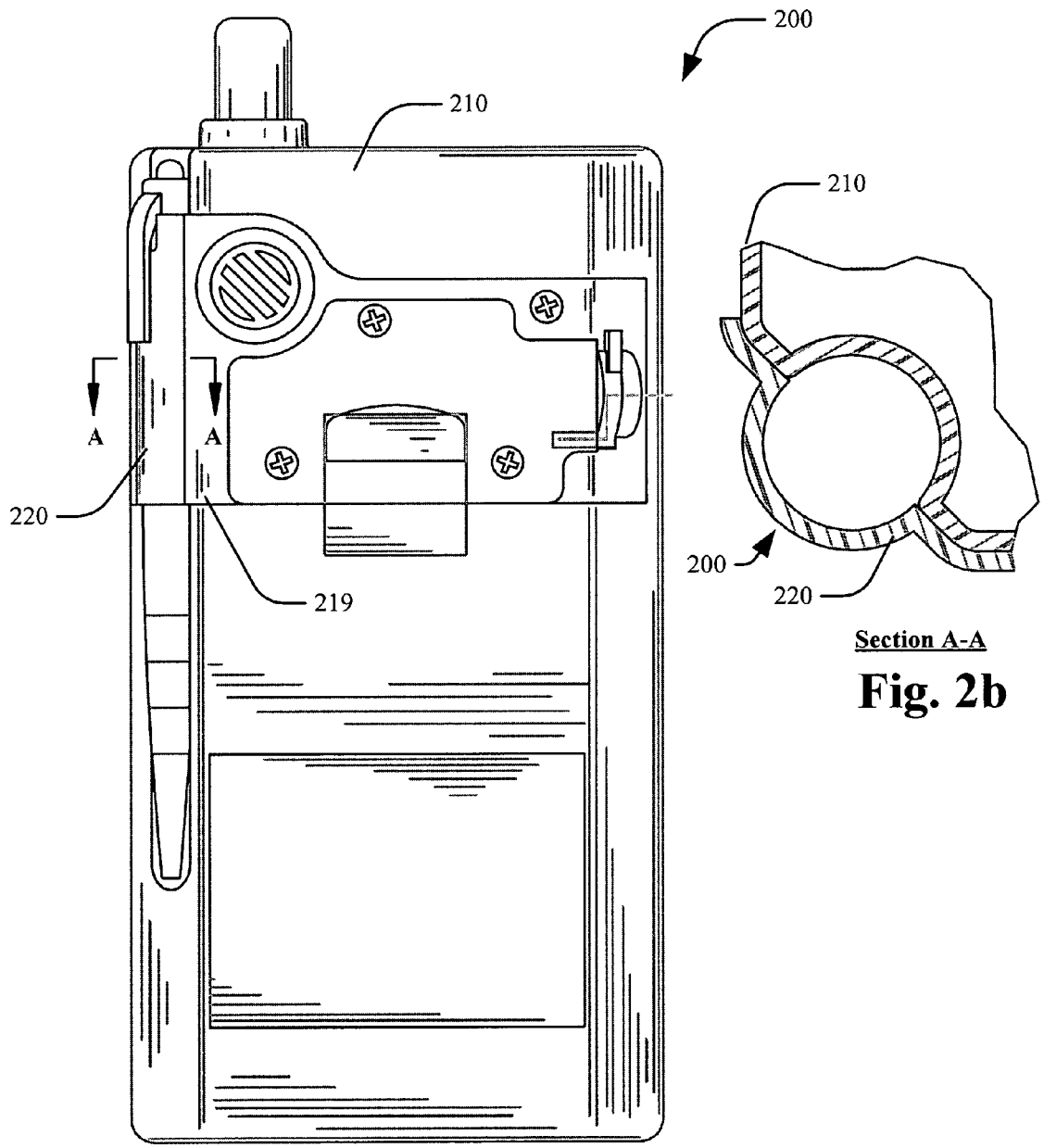
FIGS. 2a & 2b illustrate a cross section configuration of the stylus compartment for the mobile computing unit.

FIGS. 2a and 2b illustrate a back side of the mobile computing unit 200 and compartment cross section (section A-A) having a cylindrical configuration. The cylindrical configuration 200 has a cross section formed from two semi-circular surface areas, wherein one semi circular surface area is a segment of the housing 210 (e.g., back housing) and the other semi circular surface area is extension 220 of the housing plate 219, which is attachable to the back/front housing, for example. As such, if a portion of the stylus compartment 200 that is part of the housing plate 219 is damaged, the housing plate 219 can be readily replaced without typically a need for disassembling the mobile computing unit 200 and/or the housing. It is to be appreciated that other configurations (e.g., a channel shaped structure) can also be employed for forming the stylus compartment, and such configurations are well within the realm of the subject innovation.

As explained earlier, the external compartment for hosting the stylus, according to an aspect of the subject innovation, mitigates a requirement of having an opening into the housing itself. This reduces a risk of liquid or particulate contaminants entering into the device and degrading performance of the mobile computing unit, thus increasing reliability.

Figures 3A, 3B:
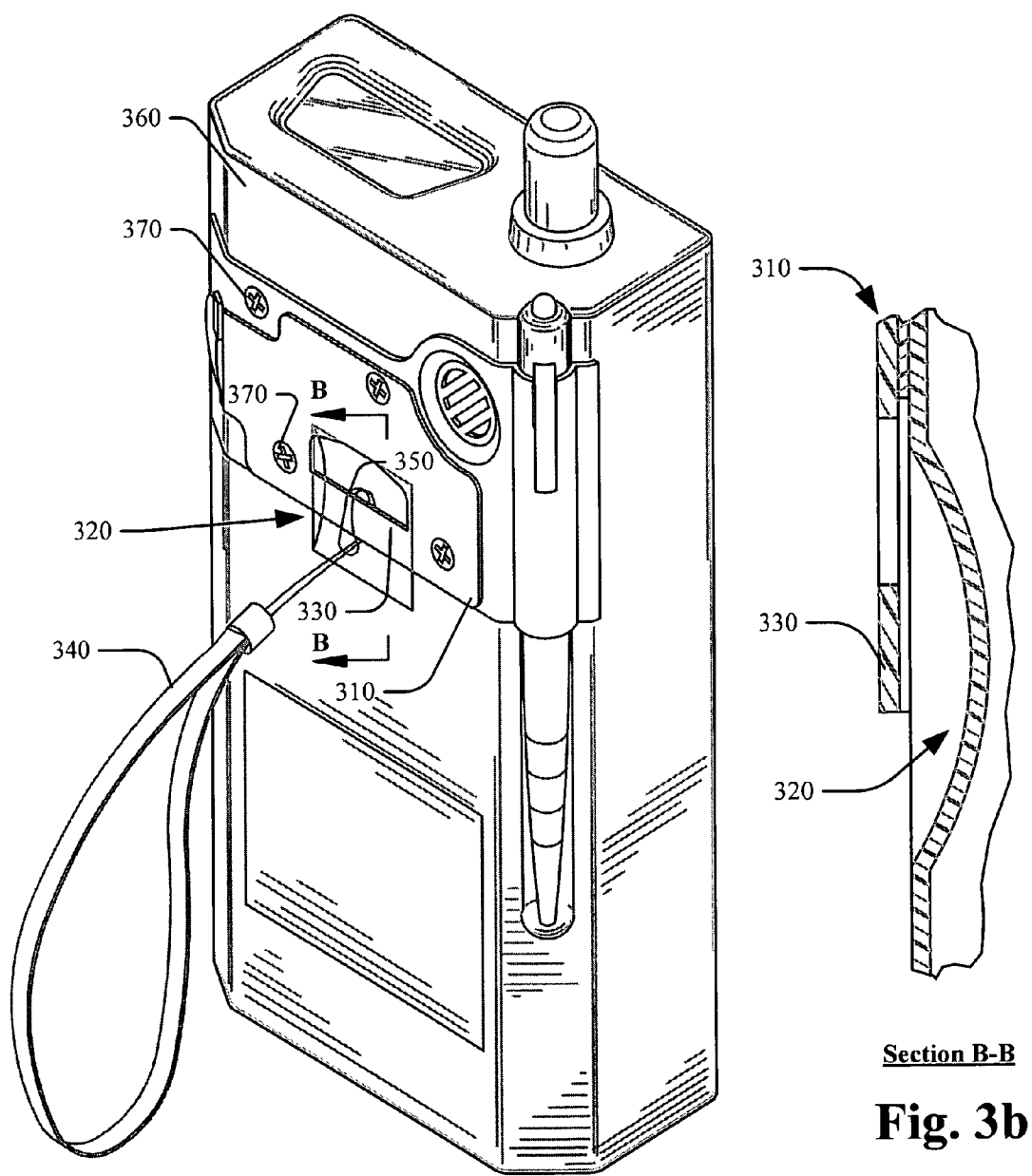
FIGS. 3a & 3b illustrate an exemplary hand strap attachment formed by the housing and the housing plates of the subject innovation.

FIGS. 3a & 3b illustrate a further exemplary aspect of the subject innovation, wherein part of the housing plate(s) 310 can extend over a recess 320 in the back housing to form a bridge shaped element 330, which functions as an anchor to hold a strap 340. The housing plate 310 can have a plurality of configurations (e.g., non planar curved surface) and can be attached to another housing plate 350 and/or the back of the housing 360 via corresponding latch receiving notches/apertures and/or screws 370.

As shown, the hand strap 340 is made up of a loop 350 (e.g., partial loop) that enters the recess 320 from one side of the bridge shaped element 330 and exits the recess 320 from an opposing side of the bridge shaped element 330. For example, the hand strap 340 passes through the recess 320 and around the bridge shaped element 330. It is to be appreciated that the loop 350 can be repeated around the bridge shaped element 330 several times to adjust the length of the hand strap 340 to a desired length.

A replacement of the hand strap attachment can be readily performed by replacing the housing plate 310. Moreover, the requirement for having an opening as part of a hand strap attachment of the mobile computing unit is mitigated. Additional housing plates can be provided as provided of the modular housing, to enable an attachment of a handle (not shown) to the mobile computing unit, e.g. by sliding the handle. As such a housing plate which can be positioned at a back side of the housing, can include latches that are insertable into the latch receiving apertures in a handle. The handle can then slide such that the latches are securely engaged with the latch receiving notches and/or apertures (e.g., on a rail system). Accordingly, the handle can be removably connected to the mobile computing unit.

Figure 4:
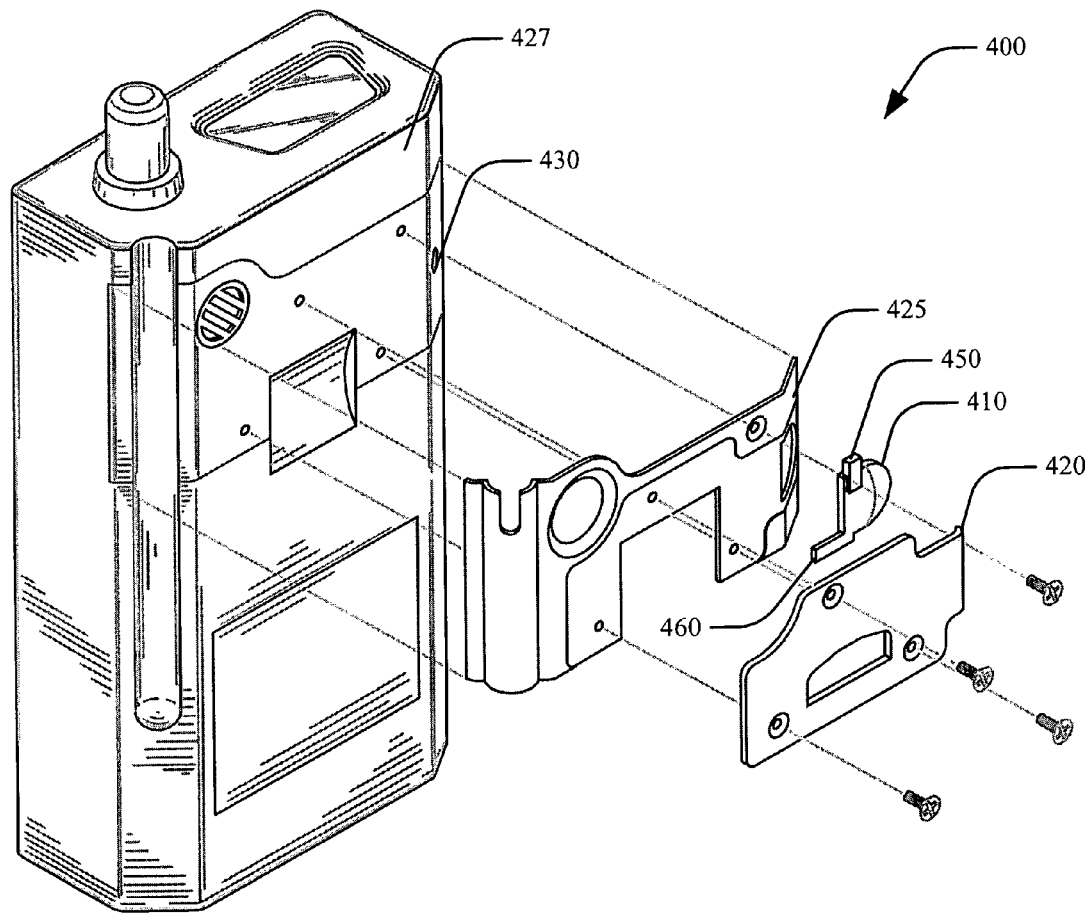
FIG. 4 illustrates a broken perspective arrangement for holding a socket cover sandwiched between the housing plates and the housing as part of the subject innovation.

FIG. 4 illustrates a broken perspective for a related exemplary arrangement of a socket cover 410 that is sandwiched between the housing plate 420 and the housing 427, and/or another housing plate 425. The socket cover 410 can be in from of a flap that covers the socket(s) 430. Such socket(s) 430 can contain one or more input/output ports for transmitting and receiving image and text content, communication signals, and audio signals. The ports can include a USB (Universal Serial Bus) port, IEEE 1394 port, or other conventional serial communications architecture operable to connect to a host computer, and/or peripheral device, such as a printer. It is to be appreciated that in lieu of or in combination with the physical ports, a wireless interface can be used for wireless communications according, e.g., IEEE 802.11 ab/g standards and in support of Bluetooth and other short distance wireless communications schemes. Additionally, the mobile computing unit can connect to a wired network via a conventional network interface included as one of the ports. The wireless interface also facilitates detecting and communicating with transponder devices of products. The ports include an audio receptacle port for receiving the headgear jack of the audio headgear described herein, and for providing signals thereto from an internal audio headgear detection system described herein.

The socket cover 410 can provide a tight seal for the socket opening 430, between the housing of the hand-held mobile terminal and the housing plate 420. As illustrated the socket cover 410 is provided around the perimeter of, and over the opening of the socket 430 and is operable to keep out contamination, which might otherwise enter the socket 430 from the outside and thereby affect performance of the mobile computing unit. The socket cover 410 can be of rubber, foam, or any other elastomer, operable to sufficiently seal the socket 430 of the mobile computing unit. Such seal mitigates dust and other contaminates from entering the clean environment of the socket 430.

As illustrated, the socket cover 410 that conceals the socket 430 associated with the mobile computing unit is sandwiched between the housing plate 420 and the housing (e.g., back housing) 427 of the mobile computing unit 400. Such cover can include a grip feature 450 on one side and a hinge 460 on another, wherein a user can expose the socket 430 by holding the grip feature 450 and rotating it around the hinge 460. The socket cover 410 can be readily replaced by removing the housing plate 420 from the housing, without a requirement to disassemble the mobile computing unit and/or associated housing.

Figure 5:
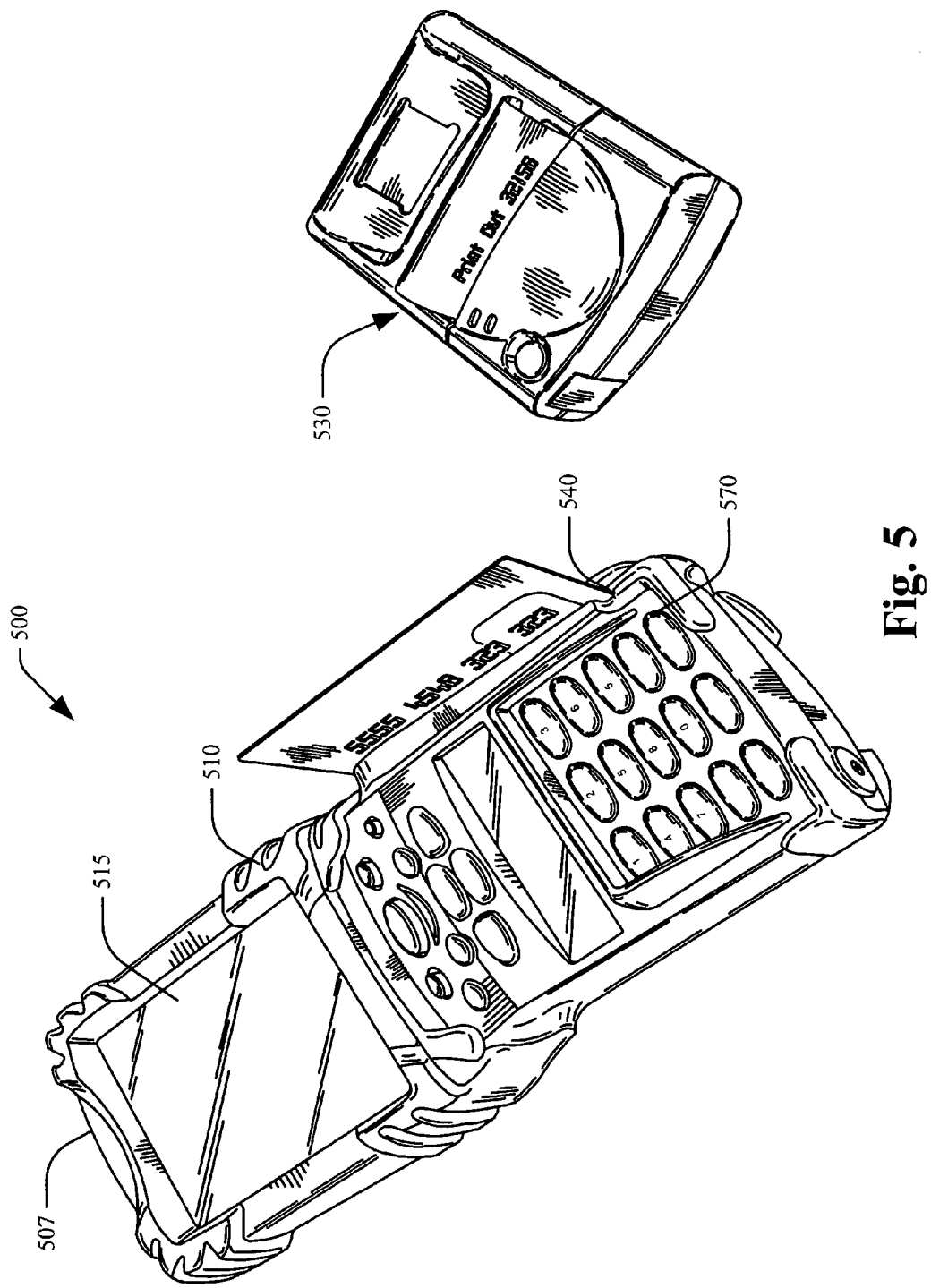
FIG. 5 illustrates a hand held terminal that can employ a modular housing with housing clips in accordance with an aspect of the subject innovation.

FIG. 5 illustrates a mobile computing unit that can employ a modular housing with housing plates in accordance with an aspect of the subject innovation. The handheld terminal 500 includes a housing 510 which can be constructed from a high strength plastic, metal, or any other suitable material. The portable terminal 500 can also include a display 515 that functions to display data or other information relating to ordinary operation of the handheld terminal 500 and/or mobile companion 530.

Additionally, the display 515 can display a variety of functions that are executable by the handheld terminal 500 and/or one or more mobile companion(s) 530. The display 515 can provide for a touch screen interface that can employ capacitive, resistive touch, infrared, surface acoustic wave, or grounded acoustic wave technology.

The handheld terminal 500 can also include a magnetic strip reader 540 or other data capture mechanism. The handheld terminal 500 can also include a window 507 in which a bar code reader/bar coding imager is able to read a bar code label, or the like, presented to the handheld terminal 500. The handheld terminal 500 can include a LED (not shown) that is illuminated to reflect whether the bar code has been properly or improperly read. Alternatively, or additionally, a sound may be emitted from a speaker (not shown) to alert the user that the bar code has been successfully imaged and decoded. The handheld terminal 500 also includes an antenna (not shown) for wireless communication with an RF access point; and an IR transceiver (not shown) for communication with an IR access point.

The keypad 570 can include a top cover and a bottom cover that can be over molded around a common boundary. The top cover and the bottom cover can sandwich a plurality of associated keypad components (e.g., flex members, electro luminous panel, a silicone membrane with a plurality of keys thereupon printed circuit boards, LEDs, and the like). The common boundary can be formed by a surface area and/or line perimeter common to the top cover and the bottom cover, (e.g. a contact surface between top and bottom cover, a surface encapsulating the keypad components, edges of the stacked components and the like.) Typically, materials employed for fabricating the housing with housing plate(s) can include various types of polycarbonates, thermoset plastics, thermoformed plastic, and typically material that are capable of being molded for interaction with housing plates as described in detail supra.

Figure 6:
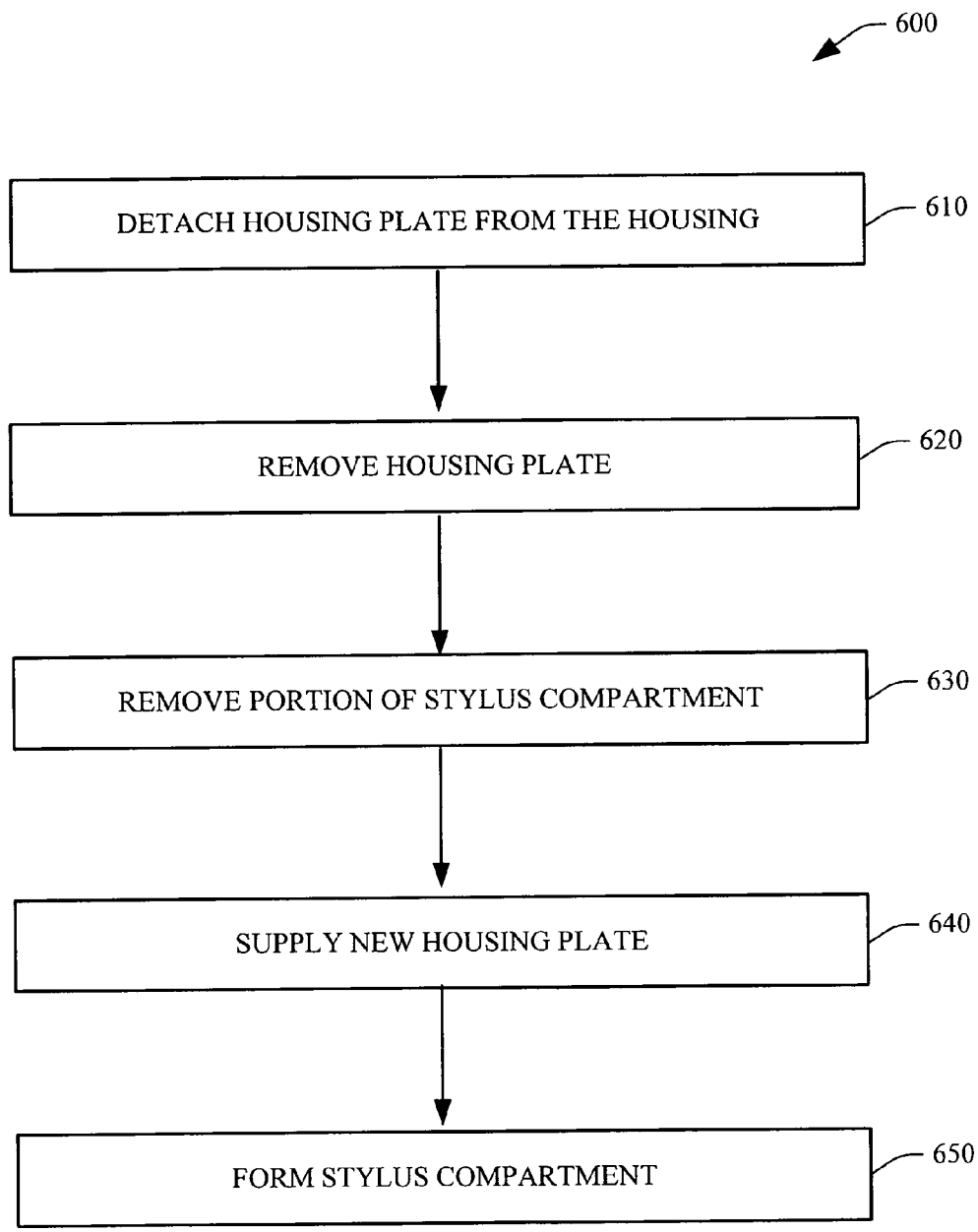
FIG. 6 illustrates a methodology of replacing a stylus compartment in accordance with an aspect of the subject innovation.

FIG. 6 illustrates a related methodology 600 of replacing a stylus/pen compartment in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially and at 610, the housing plate can be detached from a housing, via removal of the attaching screws, for example. Next, and at 620 the housing plate is removed from the housing of the mobile computing unit. Such removal of the housing plate also removes a portion (e.g., a damaged section) of the compartment of the stylus, at 630. Subsequently, and at 640 a new housing plate can be supplied and attached to the housing. As such, the compartment for the stylus can be formed again at 650, and a requirement to disassemble the mobile computing unit for replacing the compartment is mitigated.

Figure 7:
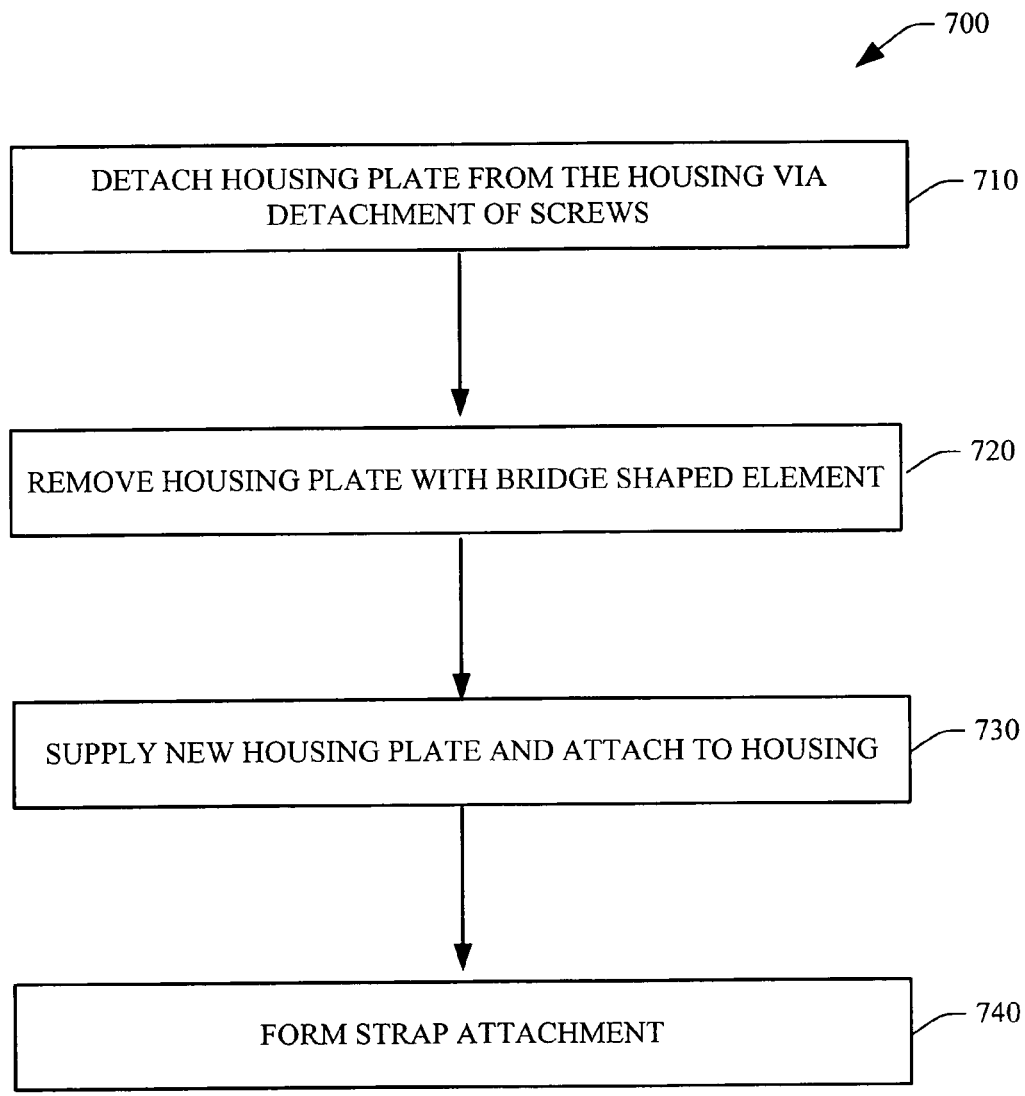
FIG. 7 illustrates a methodology of replacing a hand strap attachment in accordance with an aspect of the subject innovation.

FIG. 7 illustrates a related methodology 700 of replacing a hand strap attachment in accordance with an exemplary aspect of the subject innovation. As explained in detail supra, the hand strap is anchored around a bridge shaped element, wherein such bridge shaped element is part of the housing plate(s) that is extended over a recess in the back housing. The strap enters the recess from one side of the bridge shaped element and exits the recess from an opposing side of the bridge shaped element. Initially and at 710, the housing plate can be detached from a housing, via removal of the attaching screws, for example. Next, and at 720 the housing plate is removed from the housing of the mobile computing unit. Such removal of the housing plate also removes the bridge shaped element, which may have been damaged. Subsequently, and at 730 a new housing plate can be supplied and attached to the housing. As such, a strap attachment can be formed again at 750. Accordingly, a replacement of the hand strap attachment can be readily performed by replacing the housing plate. Moreover, the requirement for having an opening as part of a hand strap attachment of the mobile computing unit is mitigated. By reducing number of openings into the housing, a risk of liquid or particulate contaminants entering into the device and degrading performance of the mobile computing unit can be reduced and reliability increased.

Figure 8:
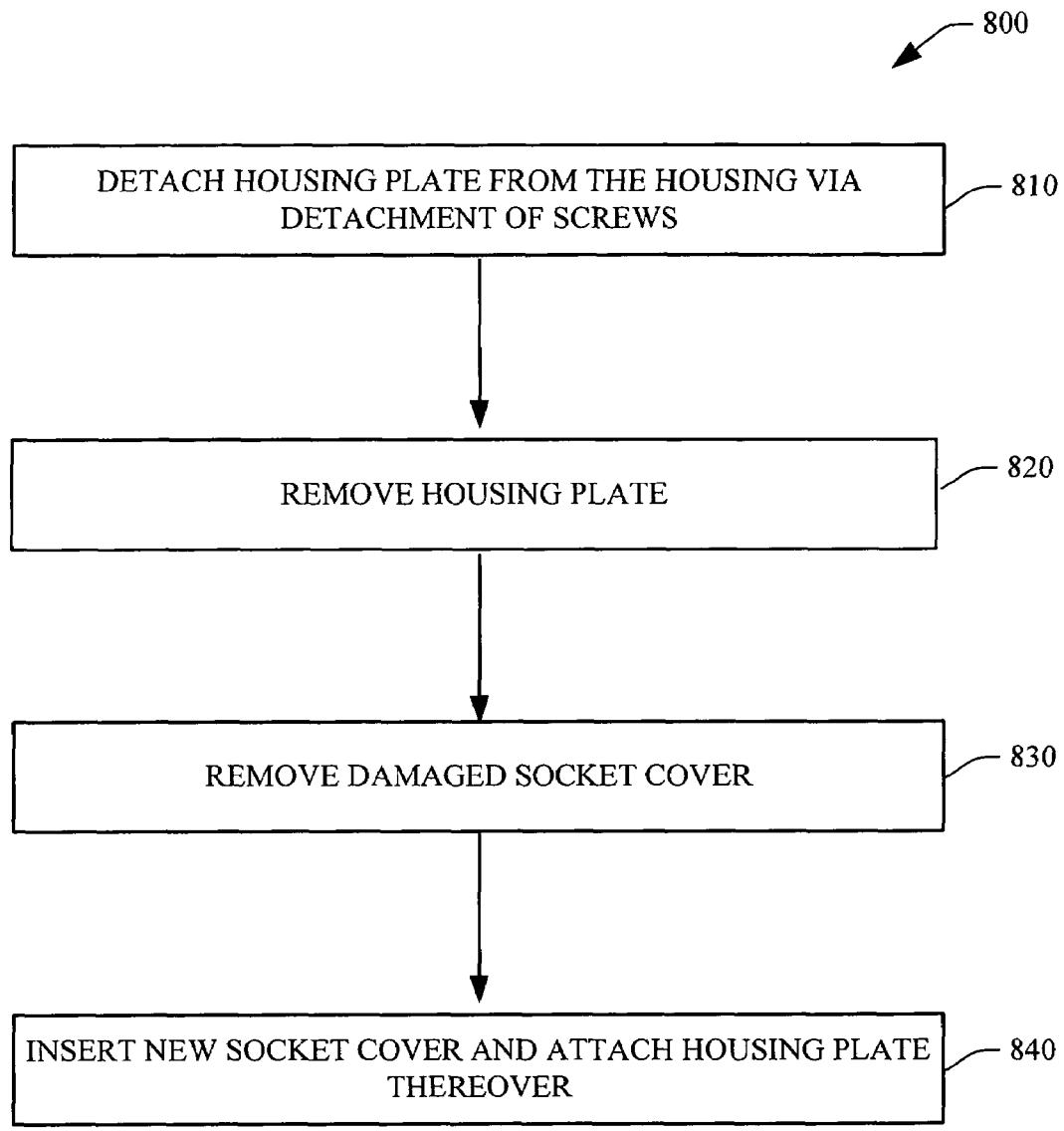
FIG. 8 illustrates a methodology of replacing a socket cover in accordance with an aspect of the subject innovation.

FIG. 8 illustrates a related methodology 800 of replacing a socket cover in accordance with an exemplary aspect of the subject innovation. As explained in detail supra, the socket cover is sandwiched between the mobile housing and the housing plate, and held in position via the force pushing the housing plate to the housing (e.g., compression/tension of screws that attach the housing plate to the housing). Initially and at 810, the housing plate can be detached from the housing, via removal of the attaching screws, for example. Next, and at 820 the housing plate is removed from the housing of the mobile computing unit. Such removal of the housing plate releases the socket cover as there no longer exists a force to press the cover against the housing. The socket cover (e.g., a damaged cover) can then be removed at 830. Subsequently, and at 840 a new cover can be inserted and the housing plate can be re-attached to the housing. As such, a replacement of the socket cover can be readily performed by removing the housing plate, and replacing the socket cover.

Figure 9:
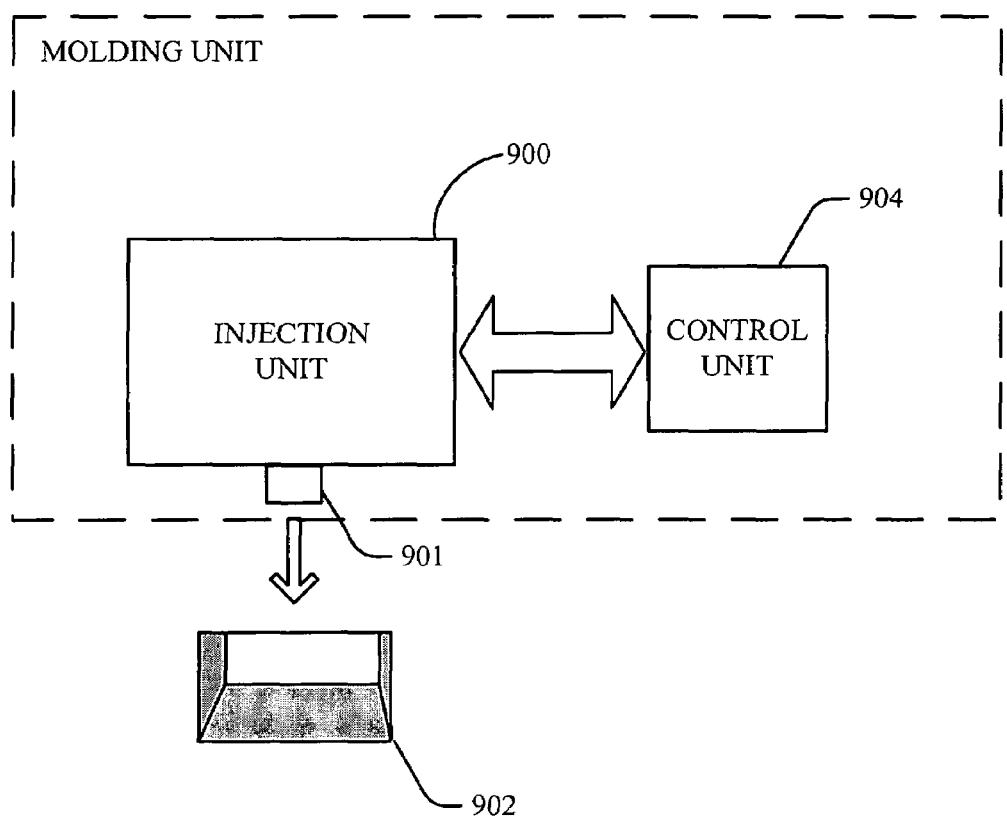
FIG. 9 illustrates a schematic diagram depicts a system for molding/over molding the modular housing and the housing plates, according to one aspect of the subject innovation.

Referring now to FIG. 9, a schematic diagram depicts a system for molding/over molding the modular housing and the housing plates, according to one aspect of the subject innovation, is illustrated. Initially, the injection unit 900 melts the polymer resin and injects the polymer melt into the molding space 902 that can house the back cover and housing components in preparation for molding. The employed resin can comprise various types of thermoset plastic or thermo plastic material such as polybutylene terephthalate, polyethylene terephthalate, polyphenylene sulfide, diallyl phthalate, phenolic resins, and the like. The resin material can be injected on to desired locations (e.g., to form the recess and/or apertures of the housing plate) via a rate sufficient to maintain an unbroken melt front, and to avoid any spraying or splashing of the plastic material within the mold cavity. In addition, the injection pressure and temperature can be regulated via a control unit 904, to moderate susceptibility of damage to the other molded/over molded components associated with the mobile computing unit.

The unit 900 may be ram fed or screw fed. The ram fed injection molding machine typically can employ a hydraulically operated plunger to push the plastic through a heated region. The high viscosity melt is then spread into a thin layer by a "torpedo" to allow for better contact with the heated surfaces. The melt converges at a nozzle 901 and is injected into the mold space 902, which can hold the back side in preparation for molding. The reciprocation screw injection molding machine employs a screw that rotates and axially reciprocates. Rotation is produced by a hydraulic motor and acts to melt, mix, and pump the polymer resin. A hydraulic system controls the axial reciprocation of the screw, allowing it to act like a plunger, moving the melt forward for injection. A valve prevents back flow of the melt from the mold cavity.

Next, the polymer flows from the nozzle 901 to the molding space 902, which can be coupled to the nozzle 901 by a sprue bushing (not shown). Typically, the injection mold 902 can include two mold halves that define a space for forming a housing including a back side and a front side associated with the mobile computing unit Before injecting plastic material into the mold space 902, the mold space can be heated to a temperature above the melting point of the plastic material by circulating a heat carrier flowing through a heating device. During injection of plastic material, the flow of heat carrier can be stopped for maintaining the temperature of the mold. The injection process requirements can be regulated via a control unit 904 that includes a CPU. The control unit 904 can control and monitor, for example, the injection pressure until the molding of depression associated with a back side of the mobile computing unit, at which time the injection pressure is maintained until the plastic material has hardened around the common perimeter between the top and bottom portion of the housing.

After completely molding the desired portion of the modular housing and/or hosing plate, the mold 902 is cooled down. The molded portions can be held in place via employment of a clamp assembly associated with the mold 902. The molding process can be controlled throughout, so that the modular housing/housing plates are not dislocated or damaged.

In a mold space 902 having multiple cavities, the melt flows to each cavity by runners and is fed to the cavity through a gate (not shown). The gate can simply act as a restriction in the flow path just ahead of the mold cavity, and serves to direct the flow of the melt into the cavity and to limit back flow. The gate can comprise a plurality of gate orifices located near the edges of the mold cavity. These orifices can be located as to allow forwarding resin material into the mold cavity in roughly equal volumes on all free sides of the back side with the depression.

In addition, resin injection can be performed via gas assisted injection and non-gas assisted injection. Gas assisted injected mold processing generally comprises two steps. First, viscous thermoplastic is injected through runner conduits and gate conduits into mold cavities. Shortly thereafter gas is injected through the runners and gates to force the thermoplastic against the walls of the mold cavities to form the desired articles. In the case of non gas-assisted injection molding, there is no gas injection step.

Figure 10:
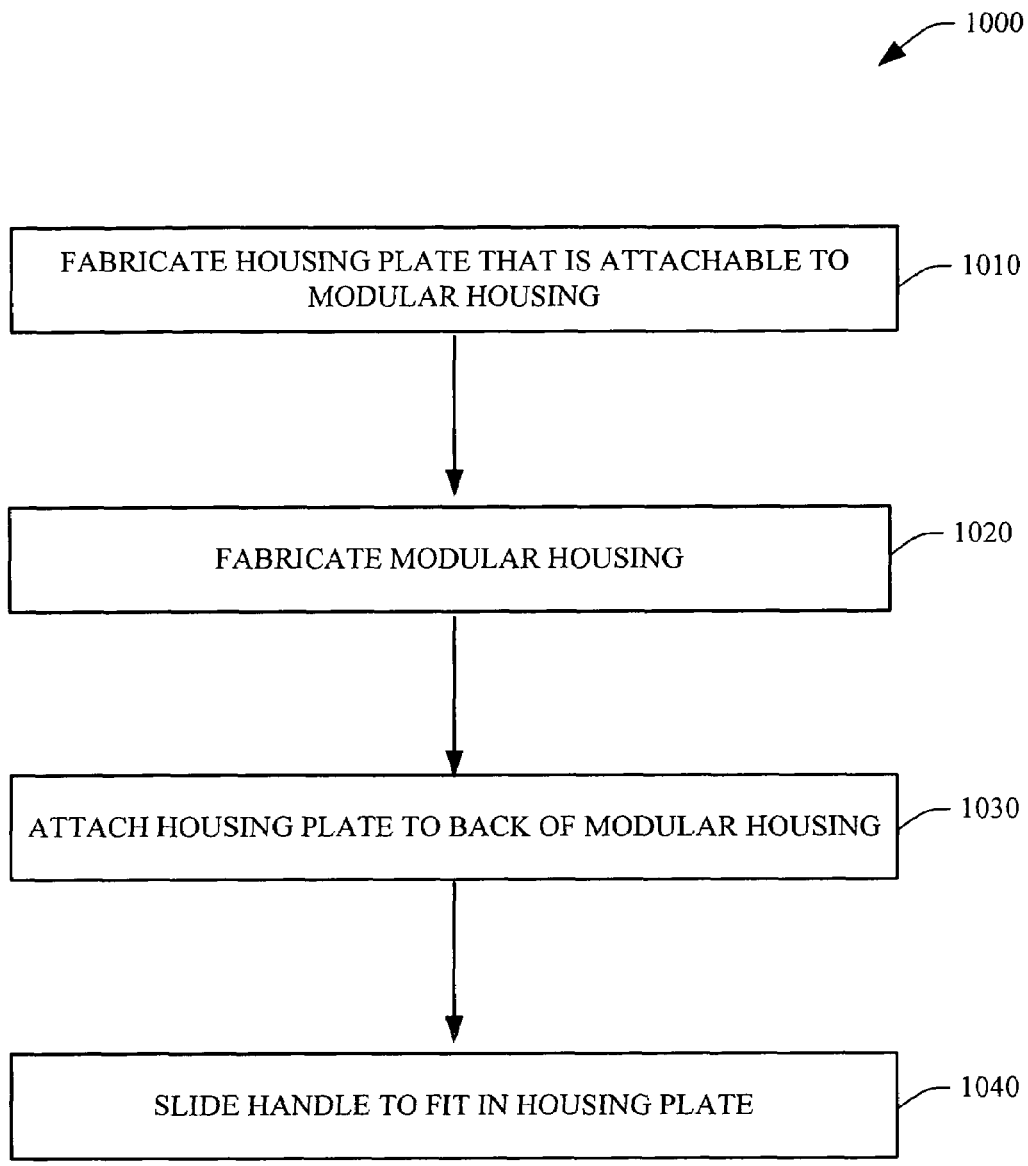
FIG. 10 illustrates a methodology of fabricating a housing plate to a modular housing in accordance with an aspect of the subject innovation.

FIG. 10 illustrates a particular methodology 1000 in accordance with an aspect of the subject innovation, wherein the housing plate can be a stand alone part that is connected to the mobile computing device, after a fabrication thereof. Initially, and at 1010 the housing plate is fabricated in form of a component with an aperture/notch mechanism that is attachable to a corresponding arrangement in the housing. Next, and at 1020 the mobile computing device can be fabricated independent of the housing back plate. At 1030, the housing back plate can be attached to a back side of the mobile computing unit. As explained, the housing plate that is positioned at a back side of the housing, can include latches that are insertable into the latch receiving apertures in a handle. The handle can then slide such that the latches are securely engaged with the latch receiving notches and/or apertures (e.g., on a rail system), at 1040. Accordingly, the handle can be removably connected to the mobile computing unit, via the housing plate. The mobile computing device can then be supplied to a user.

Figure 11:
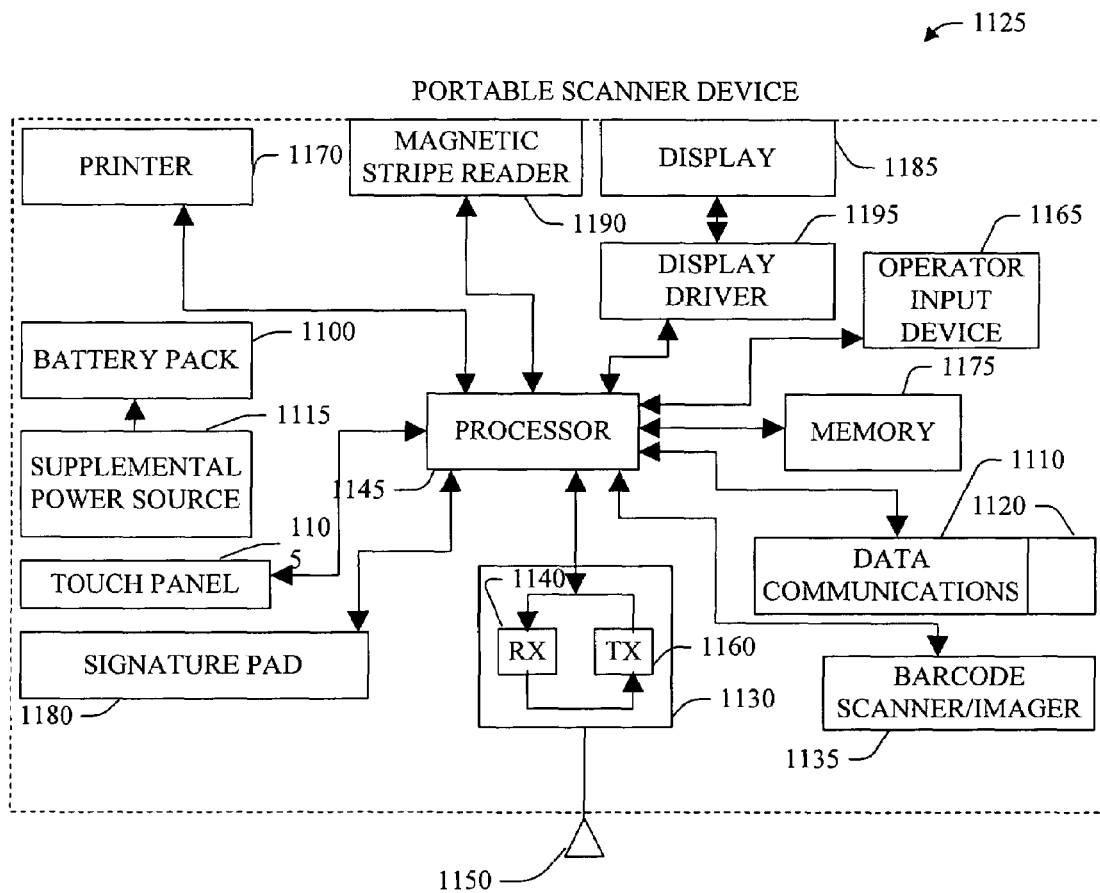
FIG. 11 illustrates a mobile computing unit that can implement a modular housing and housing plates in accordance with an aspect of the subject innovation.

FIG. 11 illustrates a particular block diagram of a mobile computing unit with housing plates attached thereto as described supra. As illustrated, a processor 1145 is responsible for controlling the general operation of a portable scanner device 1125. The processor 1145 is programmed to control and operate the various components within the scanner device 1125 in order to carry out the various functions described herein. The processor or CPU 1145 can be any of a plurality of processors, such as the p24T, Pentium 50/75, Pentium 60/90, and Pentium 66/100, Pentium PRO and Pentium 2, and other similar and compatible processors or micro controllers. A processor such as Intel's 8 bit microcontrollers, the 8031, 8051 or 8052 can also be employed. The manner the processor 1145 can be programmed to carry out the functions relating to the operations of the scanner device will be readily apparent to those having ordinary skill in the art based on the description provided herein. A memory 1175 tied to the processor 1145 is also included in the portable scanner device 1125 and serves to store program code executed by the processor 1145 for carrying out operating functions of the scanner. The memory 1175 also serves as a storage medium for temporarily storing information such as receipt transaction information and the like. The memory 1175 is adapted to store a complete set of the information to be displayed. According to one particular aspect, the memory 1175 has sufficient capacity to store multiple sets of information, and the processor 1145 could include a program for alternating or cycling between various sets of display information.

Display(s) 1185 is coupled to the processor 1145 via a display driver system 1195. The display 1185 is operable to display data or other information relating to ordinary operation of the portable scanner 1125. For example, the display 1185 may display a set of customer information, which is displayed to the operator and may be transmitted over a system backbone (not shown). Additionally, the display 1185 may display a variety of functions that control the execution of the portable electronic device 1125. The display 1185 is capable of displaying both alphanumeric and graphical characters. Furthermore, as explained earlier the display 1185 may be a touch screen that is capable of receiving user information as well as displaying information.

Power is provided to the processor 1145 and other components forming the portable electronic device 1125 by a battery pack 1100, which is located in the top housing. In the event that the battery pack 1100 fails or becomes disconnected from the portable electronic device 1125, a supplemental power source 1115 provides power to the processor 1145, the supplemental power source 1115 being a super capacitor connected electrically in parallel with the battery 1100. The hand-held terminal 1125 may enter a minimum current draw of sleep mode upon detection of a battery failure.

The portable electronic device 1125 includes a communication subsystem 1130 that includes a data communication port employed to interface the processor 1145 with the main computer. The portable electronic device 1125 also optionally includes an RF section 1130 connected to the processor 1145. The RF section 1130 includes an RF receiver 1140, which receives RF transmissions from the main computer for example via an antenna 1150 and demodulates the signal to obtain digital information modulated therein. The RF section 1130 also includes an RF transmitter 1160 for transmitting information to the main computer, for example, in response to an operator input, or the completion of a transaction. Peripheral devices, such as a printer 1170, signature pad 1180, magnetic stripe reader 1190, touch panel 1105, can also be coupled to the portable scanner device 1125 through the processor 1145.

It is to be appreciated that the rugged hand held mobile terminal design of the subject invention, as described herein, has wide applicability. The design can be employed for example in numerous types of commercial and industrial electronic devices (e.g., computers, personal digital assistants, cameras, electronic games . . . ). Moreover, the methodologies of the subject invention can be employed in connection with processes associated with fabricating rugged housings related to such devices. It is also to be appreciated that the scope of the present invention is intended to include any portable electronic device.

Although the innovation has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the innovation.

In addition, while a particular feature of the innovation may have been disclosed with respect to only one of several implementations, such feature may be combined with one or more other features of the other implementations as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising".

What is claimed is:

1. A mobile computing unit comprising:
   a modular housing that removably accepts a housing plate(s), the modular housing having a segment that forms part of a stylus compartment of the mobile computing unit;
   a socket cover that is sandwiched between the modular housing and the housing plate; and
   the housing plate with an extension that fits the segment to complete formation of the stylus compartment, the stylus compartment formed without a penetration into the body of the modular housing, wherein the housing plate is secured to the modular housing bosses or fastening hardware.

2. The mobile computing unit of claim 1, the stylus compartment is formed on an edge of the mobile computing unit.

3. The mobile computing unit of claim 2, the stylus compartment with a cylindrical configuration.

4. The mobile computing unit of claim 2, the housing plate with a curved surface.

5. The mobile computing unit of claim 1 further comprising a grip feature that enables holding the socket cover for a subsequent exposure of a socket opening.

6. The mobile computing unit of claim 5 further comprising a hinge that enables a rotation of the socket cover to expose the socket opening.

7. A mobile computing unit comprising:
   a modular housing that removably accepts a housing plate, the modular housing with a recess;
   a socket cover that is sandwiched between the modular housing and the housing plate; and
   the housing plate having an element that bridges the recess to form an anchor for a hand strap connected thereto, wherein the housing plate is secured to the modular housing bosses or fastening hardware.

8. The mobile computing unit of claim 7, the hand strap partly loops around the element that bridges the recess.

9. The mobile computing unit of claim 7, the anchor for the hand strap formed without a requirement to create an opening in the mobile computing unit.

10. The mobile computing unit of claim 8, a loop repeatable around the element that bridges the recess, to adjust length of the hand strap.

11. The mobile computing unit of claim 7 further comprising a housing plate that receives a handle of the mobile computing unit via latch and aperture arrangement.

12. A method of fabricating a mobile computing unit comprising:
    removably attaching a housing plate to a modular housing of the mobile computing unit, the modular housing having a segment that forms part of a stylus compartment of the mobile computing unit;
    sandwiching a socket cover between the modular housing and the housing plate; and
    connecting an extension of the housing plate with the segment of the modular housing to form a stylus compartment, without a penetration into the body of the modular housing.

13. The method of claim 12 further comprising bridging a recess of the modular housing with a portion of the housing plate to form an anchor for a hand strap of the mobile computing unit.

14. The method of claim 12 further comprising removably attaching a handle to the mobile computing unit.

15. The method of claim 12 further comprising removing the housing plate for changing a portion of the stylus compartment.

16. The method of claim 12 further comprising removing the housing plate for changing a hand strap of the mobile computing unit.

17. The method of claim 12 further comprising removing the housing plate for changing a socket cover associated with the mobile computing unit.

18. A mobile computing unit comprising:
    means for removably attaching a housing plate to a modular housing of the mobile computing unit, the modular housing having a segment that forms part of a stylus compartment of the mobile computing unit;
    means for sandwiching a socket cover between the modular housing and the housing plate;
    means for connecting an extension of the housing plate with the segment of the modular housing to form a stylus compartment, without a penetration into the body of the modular housing.

* * * * *

UNITED STATES PATENT AND TRADEMARK OFFICE
CERTIFICATE OF CORRECTION

| | | |
|---|---|---|
| PATENT NO. | : 7,536,210 B1 | Page 1 of 1 |
| APPLICATION NO. | : 11/297935 | |
| DATED | : May 19, 2009 | |
| INVENTOR(S) | : Morris et al. | |

It is certified that error appears in the above-identified patent and that said Letters Patent is hereby corrected as shown below:

IN THE SPECIFICATION

In Column 6, Line 23, delete "IEEE 802.11 ab/g" and insert -- IEEE 802.11a/b/g --, therefor.

In Column 9, Line 8, delete "unit" and insert -- unit. --, therefor.

IN THE CLAIMS

In Column 11, Line 47, in Claim 1, delete "housing bosses" and insert -- housing using bosses --, therefor.

In Column 12, Line 9, in Claim 7, delete "housing bosses" and insert -- housing using bosses --, therefor.

In Column 12, Line 54, in Claim 18, delete "plate;" and insert -- plate; and --, therefor.

Signed and Sealed this

Sixteenth Day of February, 2010

David J. Kappos
*Director of the United States Patent and Trademark Office*